United States Patent [19]

De Feudis

[11] 3,813,127

[45] May 28, 1974

[54] APPARATUS FOR THE INTERMITTENT TRANSFERRING OF PACKAGED REFUSE OR LAUNDRY ARTICLES

[75] Inventor: Sergio De Feudis, Nacka, Sweden

[73] Assignee: Aktiebolaget Svenska Flaktfabriken, Nacka, Sweden

[22] Filed: Apr. 24, 1973

[21] Appl. No.: 354,101

[52] U.S. Cl.................... 302/27, 302/47, 222/194, 302/51, 251/333
[51] Int. Cl............................................ B65g 53/04
[58] Field of Search............ 302/27, 40, 47, 48, 51, 302/57, 25; 222/442, 453, 194, 355

[56] References Cited
UNITED STATES PATENTS
3,316,026  4/1967  Hallstrom ............................ 302/51

Primary Examiner—Evon C. Blunk
Assistant Examiner—Hadd Lane
Attorney, Agent, or Firm—Howson and Howson

[57] ABSTRACT

A system for pneumatically transferring material such as refuse, laundry, etc. which includes a plurality of vertical chutes into which the material is deposited. Means is provided for collecting the material within the chute and periodically discharging the material from the chute. To this end, the lower end portion of the chute is formed as a valve cooperable with the main suction line, the end portion being vertically displaceable and having a beveled bottom end cooperating with a sloping wall forming an inlet into the main suction system. When the vertical chute is closed, the beveled end bears against the wall and retains the material within the chute. When the lower end portion is elevated, the material may discharge from the chute. To assist in the discharge of the material from the chute into the main suction channel, the inlet has a socket surrounding the end portion which is enlarged relative to the end portion of the chute so that when the chute bottom disengages the sloping wall, atmospheric air is permitted to flow into the inlet portion and assist the discharge of the material into the main suction duct. When the chute is closed by downward displacement of the bottom portion, a valving projection on the end portion operates to close the atmospheric opening into the inlet portion. The end portion of the chute is preferably operated periodically.

3 Claims, 1 Drawing Figure

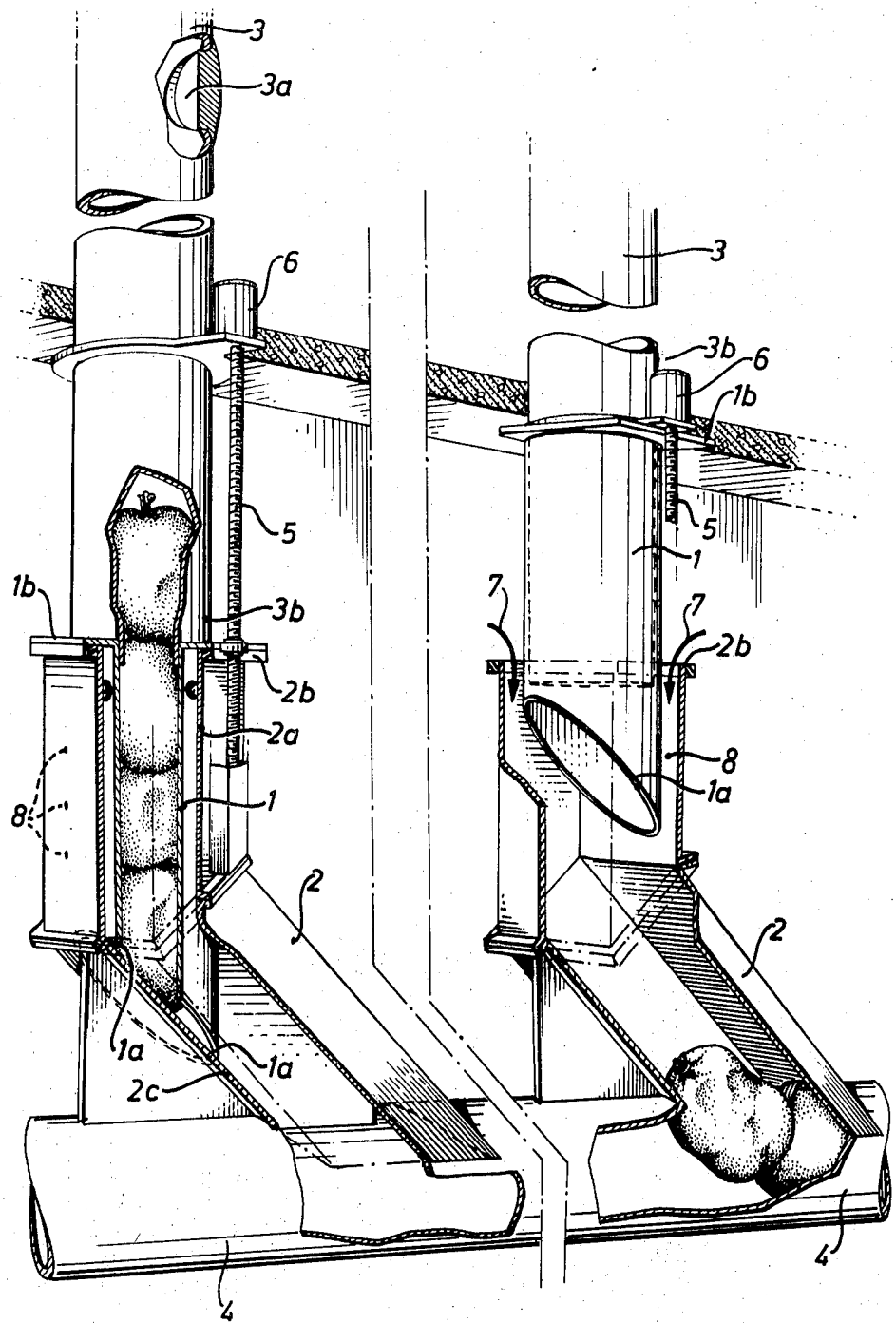

APPARATUS FOR THE INTERMITTENT TRANSFERRING OF PACKAGED REFUSE OR LAUNDRY ARTICLES

The present invention relates to improvements in or relating to apparatus for the intermittent transferring of packaged articles, especially discrete, voluminous refuse or laundry articles from a plurality of substantially vertical branch ducts passing through the different storeys, with separate lockable charging openings in each storey, in large appartment buildings or hospitals, to a substantially horizontal main channel, to which each of the vertical ducts conduct said articles by means of transporting air, said apparatus including between each duct and channel a knee-shaped joint comprising partly a lower joint portion forming an acute angle with said horizontal main channel and an upper joint portion projecting substantially vertically upwards from the lower portion and enclosing the lower end of the respective substantially vertical branch duct carrying the articles to be pneumatically transported, and a valve member being arranged in said joint, the apparatus further including a common fan unit having its suction side connected to said horizontal channel by means of one or several separators to separate said pneumatically transported articles from the transporting air.

A problem in apparatus of this kind is the transfer even of voluminous refuse or laundry articles from a branch duct having a chute via sluice or valve means to said transport duct.

It is an object of the present invention to solve the technical problem of a soft and immediate starting of the transfer by the supply of transporting air at the point of transfer from the vertical branch duct to the horizontal main duct, the transport duct to an accumulating container or destruction ovens.

An embodiment of the apparatus according to the invention is characterized in that the upper, substantially vertical part of the joint is made of polygonal, preferably quadratic form and in that the movable valve member is of cylinder-shaped form with a beveled lower end corresponding to the acute inclination angle of the wall defining said lower portion of the joint and with a flanged upper end resting in its first, lowest position on the corresponding flanged top of said vertical part of the joint, thus closing off the branch duct from the ambient air and from said main channel, and in its second, gradually raised position sucking in the ambient air as at least a portion of the transporting air to the branch duct and gradually opening the free passage for said discrete articles between said branch duct and said main channel, thus emptying the respective, substantially vertical branch ducts.

The invention will now be closer described with reference to the accompanying drawing, illustrating by way of example in a perspective view - partly with the duct housing cut away - an embodiment of the invention object in a refuse conveying system with two vertical ducts and one horizontal main duct carrying away pneumatically the packaged articles to a non-shown refuse compactor or a laundry container.

In the drawing 1 designates a reciprocally movable valve member. 2 stands for a knee-shaped joint. 3 is a couple of vertical ducts being used as shafts in different buildings for packaged articles of different kind and shape, either intended to be destroyed in an oven - as for household refuses - or to be collected at a central station - as for laundry articles in hospitals. 4 illustrates the horizontal main duct, to which said vertical ducts lead the articles via a sluicing valve member at each joint. Thus the vertical duct 3 communicates with the horizontal duct 4 by means of a knee-shaped joint or connector piece which comprises partly a lower tubular portion 2 forming an acute angle with the duct 4, and partly an upper tubular portion 2a enclosing a lower end 3b of the duct 3. In the shown embodiment the upper joint portion 2a is of quadratic form. There is a separate liftable and lowerable pipe portion 1 between the portion 2a and the end 3b. There are coacting quadratic-shaped flanges 1b and 2b on the pipe portion 1 and the upper portion 2a. Upward and downward movement of the pipe portion 1 is effected by a screw means comprising a nut and screw 5 driven by an electromotor 6. The pipe portion 1 is lifted and lowered telescopically by the screws 5 and the electromotor 6 at definite intervals of time, between a first position - to the left - closing off the branch duct 3 from the main duct 4 and a second position - to the right - in which the ducts 3 and 4 communicate freely. The joint or connector piece comprises sluice or valve means for sluicing transporting air into gap between the pipe portion 1 and the pipe socket 2 and for sluicing out packages of material from the branch duct 3 to the main duct 4, and is particularly space-saving in the embodiment illustrated. Its entire height up to the charging height in the first storey - nearly the lockable charging opening - of a building can be utilized for the storing of material between intermittent charging of the main duct 4. During the storage periods, the pipe portion 1 rests firmly with its beveled and 1a on the slanting wall portion 2c of the lower tubular joint portion 2 and thus there is no movable valve blade, as is the case in conventional arrangements in apparatus of this kind.

The pipe portion 1 is opened and closed substantially without the emanations of shock, which is a great advantage, for example at installations in residential buildings, and particularly in hospitals where extraneous vibrations and noise are to be avoided. The main duct 4 may have an intake opening for transporting air at its cut end opposite its connection with the suction fan and be equipped with a rotary damper adjacent such an intake opening for adjusting the proportion between air passing through such an air intake and air passing through the gap between the valve member i.e., the pipe portion 1 and the pipe socket 2. However, in the invention object, as illustrated, there is in most cases no need for any extra air supply. In all four corners - illustrated by the arrow 7 and the designation 8 for the space between the movable telescopie valve member 1 and the surrounding upper portion 2a of the joint 2 fastened at an acute angle to the main duct 4. During the collecting and storage periods, the liftable and lowerable telescopie valve member 1 rests with its beveled end 1a on the wall 2c defining the lower joint portion 2. The vertical branch duct 3 thereby can be filled with material in its entirety up to the charging opening 3a of the first floor. The branch duct, therefore, in this embodiment of the sluice or valve means has a greater capacity that in conventional valve means. The pipe portion 1 is thereafter lifted by the motor-operated screw 5 to its second position - see the right part of the drawing. Transporting air will then automatically flow in through the gap 8 between the valve 1 and the socket 2a. When, subsequent to the upward movement the pipe portion 1 is again lowered to the bottom position shown to the left, the flange 1b is caused to seat firmly against the flange 2b in a sealing disposition and the transporting air is prevented from flowing in. The interval between two upward movements of the pipe portion 1 to discharge branch duct 3 may be determined by means of a photoelectric means by the degree of filling of the branch duct or as a function of time.

It will be understood that the packaged refuse or laundry articles after their pneumatical transport to a central station are separated from the air by one or more non-shown separators. The refuse articles subsequent to their separation can of course possibly in a separator closest to the fan unit, be compressed and preferably destroyed, whilst the air after a final cleaning is returned to the pressure side of the fan unit of the plant.

I claim:

1. Apparatus for the intermittent transferring of packaged articles, especially discrete, voluminous refuse and laundry articles from a plurality of substantially vertical branch ducts passing through the different storeys, with separate charging openings in each storey, in large appartment buildings or hospitals, to a substantially horizontal main channel, to which each of the vertical ducts conduct said articles by means of transporting air, said apparatus including between each duct and said channel a joint comprising partly a lower joint portion forming an acute angle with said horizontal main channel and an upper joint portion projecting substantially vertically upwards from the lower portion and enclosing the lower end of the respective substantially vertical branch duct carrying the articles to be pneumatically transported, and a valve member being arranged in said joint, the apparatus further including a common fan unit having its suction side connected to said horizontal channel by means of one or several separators to separate said pneumatically transported articles from the transporting air, characterized in that at least the upper, substantially vertical part of the joint is made of polygonal, preferably quadratic form and in that the valve member of each joint is liftable upwards and downwards and is of cylinder-shaped form with a beveled lower end corresponding to the acute inclination angle of the wall defining said lower portion of the joint and with a flanged upper end resting in its first, lowest position on the corresponding flanged top of said vertical part of the joint thus closing off the branch duct from the ambient air and from said main channel and in its second, gradually raised position sucking in the ambient air as at least a portion of the transporting air to the branch duct and gradually opening the free passage for said discrete articles between said branch duct and said main channel, thus emptying the respective, substantially vertical branch ducts.

2. In a pneumatic transport system comprising a main suction duct for transferring material, a plurality of inlets into said duct, and a like number of vertical chutes connecting with said inlet by means of a valve member at the bottom of said chute, said valve member in the open position of said chute permitting discharge of material from said chute into said inlet and said suction duct and also permitting inflow of atmospheric air into said suction duct through said inlet portion, said valve member in the closed position closing both access from said chute into said duct and access for atmospheric air into said suction duct through said inlet portion, the improvement wherein said valve member comprises a vertically displaceable pipe end portion connected to said chute, a tubular socket surrounding said pipe end portion with clearance and having an opening at the top to admit atmospheric air into the clearance space between said socket and said pipe end portion, the bottom of said end portion in its lower position engaging a wall of said inlet to close access between said chute and said suction duct, and in its upper position being spaced from said inlet wall to open said access, said displaceable end portion having means to close said socket opening in the lower position of said end portion and to open said socket opening in its upper position.

3. An improvement according to claim 2 including means to periodically displace said end portion.

* * * * *